United States Patent
Porter et al.

(10) Patent No.: US 6,687,503 B1
(45) Date of Patent: Feb. 3, 2004

(54) METHOD AND SYSTEM FOR WIRELESS CONNECTION TO A WIDE AREA NETWORK

(75) Inventors: John David Porter, Little Shelford (GB); Walter Charles Vester, Philadelphia, PA (US)

(73) Assignee: Axxcelera Broadband Wireless, Inc., Santa Barbara, CA (US)

( * ) Notice: Subject to any disclaimer, the term of this patent is extended or adjusted under 35 U.S.C. 154(b) by 0 days.

(21) Appl. No.: 09/573,229

(22) Filed: May 19, 2000

(30) Foreign Application Priority Data

May 21, 1999 (GB) ................................................ 9911924

(51) Int. Cl.$^7$ ................................................. H04Q 7/20
(52) U.S. Cl. ................. 455/452.1; 455/450; 455/426.2; 370/328; 370/338
(58) Field of Search ............................... 455/422, 426, 455/450, 452, 422.1, 426.1, 426.2, 452.1, 452.2; 370/321, 328, 329, 330, 336, 337, 338, 341, 347, 349

(56) References Cited

U.S. PATENT DOCUMENTS

| | | | |
|---|---|---|---|
| 5,125,102 A | 6/1992 | Childress et al. ............... 455/9 |
| 5,479,400 A | * 12/1995 | Dilworth et al. ............... 370/60 |
| 5,781,536 A | 7/1998 | Ahmadi et al. ............... 370/252 |
| 5,832,379 A | * 11/1998 | Mallinckrodt ............... 455/427 |
| 5,898,679 A | * 4/1999 | Brederveld et al. .......... 370/315 |
| 5,936,949 A | 8/1999 | Pasternak et al. ............ 370/328 |
| 5,960,344 A | 9/1999 | Mahany ...................... 455/432 |
| 5,974,034 A | * 10/1999 | Chin et al. ................... 370/328 |
| 5,991,596 A | * 11/1999 | Cunningham et al. ...... 455/12.1 |
| 6,011,784 A | 1/2000 | Brown et al. ................ 370/329 |
| 6,097,733 A | 8/2000 | Basu et al. .................. 370/468 |
| 6,421,542 B1 | * 7/2002 | Sandler et al. .............. 455/561 |
| 6,477,147 B1 | 11/2002 | Böcking et al. ............. 370/236 |

FOREIGN PATENT DOCUMENTS

| WO | WO 97/06611 | 2/1997 |
|---|---|---|
| WO | WO 97/21276 | 6/1997 |

* cited by examiner

Primary Examiner—Nay Maung
Assistant Examiner—Tanmay Lele
(74) Attorney, Agent, or Firm—Finnegan, Henderson, Farabow, Garrett & Dunner L.L.P.

(57) ABSTRACT

A method and system for providing wireless backhaul channels for use in a cellular radio network is disclosed wherein any of the subscriber terminals can be used as a backhaul terminal thus dispensing with the need for a dedicated backhaul terminal. In the preferred embodiment, the backhaul channel is integrated with the data channels provided for network payload communications, with the backhaul data being allocated the highest data priority and a traffic scheduler allocating the backhaul data time slots for transmission accordingly. This has the advantage that the bandwidth required for backhaul can be dynamically assigned to cope with the network loading at any time.

16 Claims, 1 Drawing Sheet

METHOD AND SYSTEM FOR WIRELESS CONNECTION TO A WIDE AREA NETWORK

TECHNICAL FIELD

The present invention relates to a system and associated method of operation for connecting a cellular communications network to a wide area network using a wireless connection.

More particularly, the present invention relates to a system and associated method of operation providing wireless connection from a cellular network to a wide area backbone network, wherein no additional independent or dedicated equipment is required, and the connection may be provided using existing network equipment used for normal data communications within the cellular network.

CROSS-REFERENCES TO RELATED APPLICATIONS

The reader is hereby referred to co-pending applications U.S. Appln. Ser. No. 09/540,995, entitled "Data Communications Method and Data Signal" filed Mar. 30, 2000, and U.S. Appln. Ser. No. 09/548,183, entitled "A Method and System for Data Traffic Scheduling" filed Apr. 13, 2000, which are hereby incorporated herein by reference.

BACKGROUND OF THE INVENTION

Within a cellular network the traffic in each cell must be aggregated at a central point into a single network medium for connection onto a wide area backbone or trunk network. Such a connection would typically be provided using a wired connection such as a coax or optical fibre line, known as the backhaul path. The backhaul path for each cell must have as much total bandwidth as the whole network in each cell, plus some overhead for network control and network management signalling.

In addition to using a wired connection, it is also known to instead pass the backhaul data via a wireless channel, provided that channel has sufficient bandwidth. The major advantage of using a wireless backhaul channel is that a cellular network deployment can be achieved without paying the substantial costs of providing wired backhaul to the central node at each cell site. Prior art implementations of wireless backhaul have, however, typically required additional network equipment to provide the wireless link, in that at least one dedicated backhaul terminal has typically been provided to which cell sites transmit their backhaul data for transmission onto the wide area network (WAN) via a standard wired connection, the backhaul terminal typically being of a different design to the normal customer subscriber terminals, and unable to operate as anything other than a backhaul terminal.

SUMMARY OF THE INVENTION

The present invention improves upon the known prior art by providing a method and system to provide a wireless backhaul connection from a cellular network to a wide area network in which at least one subscriber terminal in at least one of the network cells is able to act as the backhaul terminal, meaning that no additional network equipment is required to provide the backhaul connection.

According to the present invention, there is provided a method of wireless connection of a cellular communications network comprising one or more cells, each cell having a central control node and one or more remote subscriber nodes, to a wide area network, comprising the steps of:

connecting at least one remote subscriber node to the wide area network via a wired connection;

collecting backhaul data traffic to be transmitted to the wide area network from each network cell at the respective central control node in each cell; and transmitting the backhaul data traffic from each central control node to the at least one remote subscriber node at least partway over a wireless backhaul channel.

Furthermore, according to the present invention, there is also provided a system providing wireless connection of a cellular communications network comprising one or more cells, each cell having a central control node and one or more remote subscriber nodes, to a wide area network, comprising:

a wired connection means for connecting at least one remote subscriber node to the wide area network;

means for collecting backhaul data traffic to be transmitted to the wide area network from each respective network cell, said means provided at the respective central control node of each cell; and means for transmitting the backhaul data traffic from each central control node to the at least one remote subscriber node at least partway over a wireless backhaul channel.

The wireless channel to the subscriber terminal providing the is backhaul connection may be of an operating frequency and bandwidth that is well outside the normal operating band of the cellular network, or may instead be within the same band. In the latter case, highly directional antennas are used on the link to minimise co-channel interference with communications on the cellular network. The latter arrangement has the added advantage that spectral efficiency of the network is improved.

Preferably multiple backhaul connections provided for the cellular network, and in particular at least one backhaul connection is preferably provided for each network cell.

The subscriber terminals providing the backhaul connections may be located within the particular respective cells for which they are providing backhaul, or may be located outside the cells. In the case of the latter, the wireless link may be provided by an out-of-band microwave radio link, or a directional in-band radio link, and furthermore the subscriber terminal providing backhaul preferably does not also act as a customer terminal in that it provides network service to a customer.

Alternatively, in either case the connection between the central node of a particular cell to the subscriber terminal providing backhaul may be controlled within the same network layers as other network communications within the cell. That is, the wireless backhaul connection is provided as part of the network medium access control mechanism for controlling access of the subscriber nodes and of the central control node to the network medium in each cell. In the case where the medium access control mechanism is based upon a time division multiple access (TDMA) system, the backhaul data must be assigned time slots in which they may be transmitted to the subscriber terminal providing the backhaul connection. This has the disadvantage that the effective bandwidth available to the subscriber terminals in the cell in some cases is reduced by half, but has the advantage that the backhaul bandwidth may be dynamically assigned by the medium access controller as required. A further advantage is that greater flexibility and control may be achieved by integrating the backhaul connection into the network medium access control mechanism, and particularly during periods of high network loading.

It is an advantage of the present invention that because the backhaul connection is provided wirelessly, a solar powered base station can be deployed remotely without any land line power or backhaul

BRIEF DESCRIPTION OF THE DRAWINGS

Further features and advantages of the present invention will become apparent from the following descriptions of a number of particularly preferred embodiments thereof, presented by way of example only, and by reference to the accompanying drawings, in which.

DESCRIPTION OF THE PREFERRED EMBODIMENTS

Figure 1:
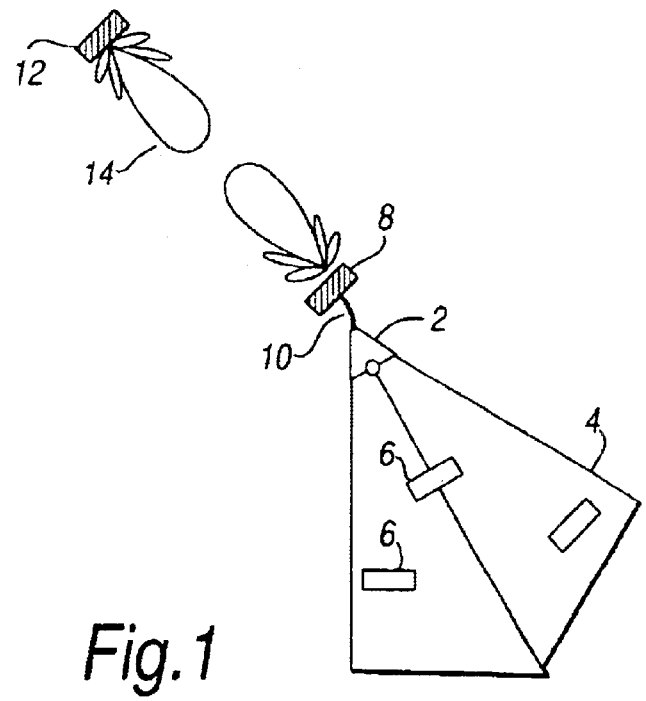
FIG. 1 shows a diagrammatic representation of one network arrangement providing wireless backhaul according to the present invention.

A first embodiment of the present invention will now be described with reference to FIG. 1, applied to a wireless network in which the present invention is particularly, although not exclusively, suitable for use therein.

We have developed a wideband wireless access network, as described in co-pending U.S. application Ser. No. 09/540, 995, entitled "Data Communications Method and Data Signal" filed Mar. 30, 2000, and U.S. application Ser. No. 09/548,183, entitled "A Method and System for Data Traffic Scheduling," filed Apr. 13, 2000, which are incorporated herein by reference. The purpose of the network is to provide high bandwidth internet access to large metropolitan areas. The network is deployed in a cellular manner, with one subscriber terminal for each customer being served. Multiple subscriber terminals in a close geographic area can be served by a single base station, known as an access point. By the term "cellular," we mean merely that the network is geographically arranged into cells, each cell being provided with a base station and multiple subscriber terminals within the cell communicating with the base station. The subscriber terminals may be fixed or mobile, and the term "cellular" is not meant to imply that the subscriber terminals are mobile, such as, for example, GSM mobile telephones.

The network is designed to use reservation-based time division multiple access to provide dynamically requested bandwidth to multiple users, as described in co-pending U.S. application Ser. No. 09/540,995. Because bandwidth is dynamically assigned, bandwidth can be over-allocated using the principal of statistical multiplexing Subscriber terminals with traffic to pass over the network must contend for bandwidth. The traffic passed over the network is prioritized into classes of service, giving a contention resolution algorithm additional information for assigning bandwidth among the contending subscriber terminals. The subscriber terminals in our network have been designed to pass steady state data rates of 25 MBPS, equal to the total aggregate bandwidth of the area covered by a single access point, although other data rates may also be used. The network has also been designed with two types of antennas, narrow- and wide-beam. The wide-beam antenna has a 3 dB main beamwidth of 60 degrees, and is generally used as the access point antenna. The narrow-beam antenna has a 3 dB main beamwidth of 20 degrees, and is generally used at the subscriber terminals. It is to be understood, however, that the present invention is not to be limited to the use of antennas with these precise specifications, and many other antennas will be apparent to those skilled in the art suitable for use with the present invention.

Within the presently described first embodiment of the present invention, a wireless backhaul path using point-to-point microwave links is provided. With reference to FIG. 1, an access point 2 serving a sector 4 is connected via short wired backhaul 10 to a subscriber terminal 8, here applied to pass backhaul traffic only from the connected access point 2. The sector 4 contains a plurality of subscriber terminals 6, each configured to provide network service to a customer. The backhaul subscriber terminal 8 communicates via a point-to-point wireless connection 14 with another access point 12, which is connected to a wired backhaul path to the wide area network (not shown). Thus, backhaul traffic from the access point 2 serving network customers is passed wirelessly via a subscriber terminal/access point pair (terminals 8 and 12) employed exclusively for passage of backhaul traffic.

Because the subscriber terminals in our network are designed to handle a sustained data rate equivalent to the total capacity of the network medium (due to the TDMA architecture), a single subscriber terminal and access point pair would be sufficient to carry all backhaul for a single access point. Here, a narrow-beam antenna substantially as described earlier is preferably used at both access point and the subscriber terminal ends of the point-to-point link, to provide enough directional gain to allow an appreciable link distance. It should be understood that a subscriber terminal/access point pair is preferably provided for each access point that acts a base station for a sector.

With respect to the frequency of operation of the microwave link 14, the microwave radio link may operate at a frequency that is well outside the operating band of the access point 2 and subscriber terminals 6, or alternatively at a frequency within the operating band of the access point 2. In the former case the advantage is obtained that the out-of-band frequency of the link creates no co-channel interference for the access point and subscriber terminals within the sector 4. In the latter case the use of a narrow beamwidth antenna as described earlier minimises radiation off-beam of the desired link, and the advantage is obtained that higher re-use of the spectrum allocated to wireless network operation can be achieved.

By use herein of the tern "radio link", we mean all necessary elements of a radio transmitter and/or receiver architecture or hardware which would be required to establish radio data communications between the subscriber terminal providing backhaul and the access points. The architecture or radio hardware chosen may be any known radio transmitter and receiver architecture capable of providing the necessary backhaul bandwidth and several different transmitter and receiver architectures will be apparent to the man skilled in the art suitable for use as the radio links of the present invention.

It should fixer be understood that the subscriber terminals used in the first embodiment of the present invention are capable of acting in a first mode of operation as customer terminals providing network service, or in a second mode of operation as backhaul terminals, but that said first and second modes of operation are mutually exclusive, and that any particular subscriber terminal must be configured to act as either a customer terminal or a backhaul terminal. Thus, while the same piece of wireless equipment that we have termed a subscriber terminal may be used as either a customer terminal or a subscriber terminal, such use may not be simultaneous. That this is so will become further apparent from the following description of those features of the subscriber terminals used in the present invention that allow such dual functionality.

More particularly, the wireless network terminal equipment is designed to be usable as an access point, subscriber terminal, or backhaul terminal. The media access controller and network processor (as described in our co-pending International applications reference earlier) operate in different modes dependent on their possible applications, however all firmware required for operation in these modes is contained within the unit, and the proper mode of operation is initialized upon power up. In addition, all radio hardware contained within a terminal is identical regardless of its application as an access point, subscriber terminal, or backhaul terminal. It is preferable that the installer of the network equipment use separate antennas designed for use in each of the three applications of the terminal, however this is not essential.

A second particularly preferred embodiment of the present invention will now be described with reference to FIG. 2. The second embodiment, is also particularly although not exclusively suitable for use with the network described earlier, a repeat description of which will not therefore be undertaken here.

Figure 2:
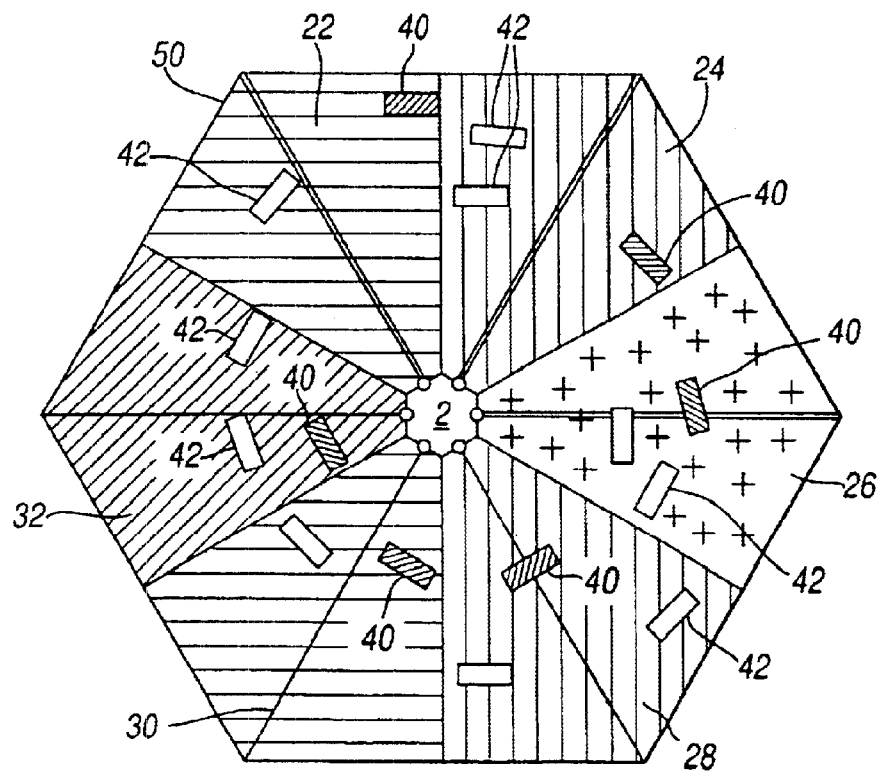
FIG. 2 shows a diagrammatic representation of another network arrangement providing wireless backhaul according to the present invention.

FIG. 2, an access point 2 provides coverage throughout a network cell 50 by dividing the cell into a number of sectors 22, 24, 26, 28, 30, and 32 each covered using a different frequency. Within each sector there is provided at least one backhaul subscriber terminal 40 which provides a wired connection to a WAN (not shown) for use as a backhaul channel for the payload data traffic passed to and from the other subscriber nodes 42 in each sector. The wireless backhaul connection between the access point 2 and the backhaul subscriber terminal 40 in each sector is controlled within the same network layers (preferably the Data and/or Network layers of the OSI 7-layer Reference Model) as the normal payload data traffic between the access point and the subscriber nodes 42. That is, the wireless backhaul connection is provided as part of the network medium access control mechanism for controlling access of the subscriber nodes and of the access point to the network medium in each sector. A more detailed description of the operation of such a mechanism is given below, applied to the network described earlier.

Within the TDMA network described earlier, time slots are allocated to each subscriber terminal in which i) downstream payload data will be transmitted to each terminal from the access point, and ii) upstream payload data is to be transmitted from each subscriber node to the access point. In the following description, time slots in which data packets are transmitted from the access point to an intended receiver subscriber terminal are referred to as downstream time slots, and time slots in which data packets which are produced by a subscriber terminal and which are transmitted to the access point for subsequent transmission onto the WAN are referred to as upstream time slots. The same naming convention is also applied to the data packets themselves.

All time slot allocation and traffic scheduling is performed by the access point, and the upstream and downstream traffic schedules for each time frame are communicated to every subscriber terminal in the access point coverage area so that each terminal has full knowledge of the expected traffic on the network medium per unit time frame. When a terminal has been granted a time slot in which to transmit, the entire capacity of the network medium becomes available to that terminal during the granted time slot.

In addition to the above, multiple traffic priorities may be assigned to data traffic indicating the urgency or importance of the payload data. The access point uses these priorities to determine the traffic schedules, and data packets of high priority are allocated bandwidth before data packets of low priority. The operation of such a medium access controller and traffic scheduler is described in detail in co-pending U.S. application Ser. No. 09/540,995, to which the reader is particularly referred with respect to the presently described preferred embodiment.

Within the presently described embodiment, in order to provide wireless backhaul within he abovedescribed framework, the backhaul data traffic is assigned the highest priority available, and then queued with the payload data traffic in a traffic queue. A single queue may be used, or preferably several queues may be maintained, one for each traffic priority type. The access point queues the upstream backhaul data to be transmitted from the network to the WAN in queue means provided at the access point. Similarly, the backhaul subscriber terminal queues the downstream backhaul data to be transmitted from the WAN to the network in queue means provided at the backhaul subscriber terminal. In addition, as all scheduling is performed at the access point, the access point also maintains a "phantom" downstream backhaul traffic queue which simply keeps a count of the amount of queued downstream backhaul data for traffic scheduling purposes.

In operation, the backhaul subscriber terminal is given priority during periods of bandwidth contention, such that it is always granted sufficient upstream time slots to transmit the downstream backhaul data to the access point over the common network medium. Similarly, sufficient downstream time slots are granted to enable the access point to transmit the upstream backhaul data to the backhaul subscriber terminal. The remaining time slots in both the up- and downstream directions are then allocated amongst all the other cell subscriber terminals.

This scheme has the effect of reducing the maximum steady state bandwidth that the wireless network in each cell sector is able to provide, since statistically half of the available bandwidth is being used for backhaul. However, the scheme has a number of positive advantages in that it allows the wired connection point for the network to be physically located anywhere within the cell coverage area, but more importantly also allows the necessary amount of backhaul bandwidth to be dynamically assigned from time frame to time frame by the medium access control mechanism. This has the effect of the network effectively self-allocating the right amount of bandwidth, thus doing away with the need for pre-allocation, and significantly improving spectral efficiency. In addition, the integration of the means for providing backhaul with the medium access control mechanism allows for improved network flexibility, and will allow for increased network functionality in the future.

Within the second embodiment as described above the backhaul terminal is stated as being located within the network coverage area of the access point, and while this is the preferred arrangement it is not essential. Alternatively, it is also possible that the backhaul subscriber terminal be located outside of the access point coverage area, although in this case the access point is preferably further provided with a narrow beam-width high gain antenna such as described previously, and aligned in the direction of the backhaul terminal in order to compensate for the additional path loss. Thus while the backhaul channel is provided in the same TDMA manner as previously described using the medium access controller of the access point, the provision of the narrow beam width antenna allows the backhaul terminal to be located outside the normal coverage area of the access point.

It is to be understood that in either of the embodiments of the present invention described above, the subscriber terminal which acts as the backhaul terminal requires no additional modification to act as the backhaul terminal, and that any subscriber terminal may be chosen as the backhaul terminal, depending upon the convenience of the geographic location of the terminal.

Finally, all of the individual network terminals themselves may each be configured to operate as a subscriber terminal providing service to a customer, a subscriber terminal with backhaul, or as a cell access point. This gives the ability to perform a flexible network deployment, and also to change the configuration of the network once deployed. In addition, the ability of each terminal to operate as any of a subscriber terminal, backhaul terminal or cell access point gives a large degree of redundancy, enabling network operation to continue even with the loss of one or more access point terminal nodes.

What is claimed is:

1. A method of wireless connection of a cellular communications network comprising one or more cells, each cell having a central control node and one or more remote subscriber nodes, to a wide area network, comprising the steps of:
   connecting at least one remote subscriber node to the wide area network via a wired connection;
   collecting backhaul data traffic to be transmitted to the wide area network from each network cell at the respective central control node in each cell;
   allocating the backhaul data traffic within a cell a traffic priority higher than traffic priorities assigned to other data traffic within the cell;
   queuing the backhaul data traffic in at least one traffic queue together with the other data traffic to be transmitted within the cell;
   scheduling one or more time slots in which the backhaul traffic will be transmitted to the at least one remote subscriber node connected to the wide area network based on the allocated traffic priorities, wherein the backhaul data traffic is scheduled for transmission prior to the other data traffic;
   transmitting the backhaul data traffic from each central control node to the at least one remote subscriber node over a wireless backhaul channel during the one or more time slots; and
   transmitting the backhaul data traffic from the at least one remote subscriber node to the wide area networks.

2. A method according to claim 1, wherein an operating frequency band of said wireless backhaul channel is outside a normal frequency band of operation of the cellular communications network.

3. A method according to claim 1, wherein an operating frequency band of the wireless backhaul channel is within a normal operating frequency band of the cellular communications network.

4. A method according to claim 1, wherein the at least one remote subscriber node transmitting the collected backhaul data from each central control node to the wide area network is located within the network cell for which it is providing backhaul.

5. A method according to claim 1, wherein the at least one remote subscriber node transmitting the collected backhaul data from each central control node to the wide area network is located within the network cell for which it is providing backhaul.

6. A method according to claim 1, wherein the connecting step further comprises connecting a plurality of remote subscriber nodes to the wide area network to provide a plurality of backhaul connections.

7. A method according to claim 6, wherein at least one backhaul connection is provided for each network cell.

8. A system providing wireless connection of a cellular communications network comprising one or more cells, each cell having a central control node and one or more remote subscriber nodes, to a wide area network, comprising:
   a connection means for connecting at least one remote subscriber node to the wide area network via a wired connection;
   means for collecting backhaul data traffic to be transmitted to the wide area network from each network cell, said means provided at the respective central control node of each cell;
   means for allocating the backhaul data traffic within a cell a traffic priority higher than traffic priorities assigned to other data traffic within the cell;
   means for queuing the backhaul data traffic in at least one traffic queue together with the other data traffic to be transmitted within the cell;
   means for scheduling one or more time slots in which the backhaul traffic will be transmitted to the at least one remote subscriber node connected to the wide area network based on the allocated traffic priorities, wherein the backhaul data traffic is scheduled for transmission prior to the other data traffic;
   means for transmitting the backhaul data traffic from each central control node to the at least one remote subscriber node over a wireless backhaul channel during the one or more time slots; and
   means for transmitting the backhaul data traffic from the at least one remote subscriber node to the wide area network.

9. A system according to claim 8, wherein an operating frequency band of said wireless backhaul channel is outside a normal frequency band of operation of the cellular communications network.

10. A system according to claim 8, wherein an operating frequency band of the wireless backhaul channel is within a normal operating frequency band of the cellular communications network, and wherein said means for transmitting the collected backhaul data traffic further comprises at least one antenna of substantially narrow beamwidth, whereby signals from said antenna are spatially separated from signals of the cellular communications network.

11. A system according to claim 8, wherein the remote subscriber node providing the backhaul connection for a particular network cell is located outside of the particular network cell.

12. A system according to claim 8, wherein the at least one remote subscriber node transmitting the collected backhaul data from the at least one central control node to the wide area network is located within the particular network cell.

13. A system according to claim 8, and further comprising a plurality of connection means for connecting a plurality of remote subscriber nodes to the wide area network to provide a plurality of backhaul connections.

14. A system according to claim 13, wherein at least one backhaul connection is provided for each network cell.

15. A method of wireless connection of a cellular communications network comprising one or more cells, each cell having a central control node and one or more remote subscriber nodes, to a wide area network, comprising the steps of:

- connecting at least one remote subscriber node to the wide area network;
- collecting backhaul data traffic to be transmitted to the wide area network from each network cell at the respective central control node in each cell;
- allocating the backhaul data traffic within a cell a traffic priority higher than traffic priorities assigned to other data traffic within the cell;
- queuing the backhaul data traffic in at least one traffic queue together with the other data traffic to be transmitted within the cell;
- scheduling one or more time slots in which the backhaul traffic will be transmitted to the at least one remote subscriber node connected to the wide area network based on the allocated traffic priorities, wherein the backhaul data traffic is scheduled for transmission prior to the other data traffic;
- transmitting the backhaul data traffic from each central control node to the at least one remote subscriber node over a wireless backhaul channel during the one or more time slots; and
- transmitting the backhaul data traffic from the at least one remote subscriber node to the wide area network.

16. A system providing wireless connection of a cellular communications network comprising one or more cells, each cell having a central control node and one or more remote subscriber nodes, to a wide area network, comprising:

- a connection means for connecting at least one remote subscriber node to the wide area network;
- means for collecting backhaul data traffic to be transmitted to the wide area network from each network cell, said means provided at the respective central control node of each cell;
- means for allocating the backhaul data traffic within a cell a traffic priority higher than traffic priorities assigned to other data traffic within the cell;
- means for queuing the backhaul data traffic in at least one traffic queue together with the other data traffic to be transmitted within the cell;
- means for scheduling one or more time slots in which the backhaul traffic will be transmitted to the at least one remote subscriber node connected to the wide area network based on the allocated traffic priorities, wherein the backhaul data traffic is scheduled for transmission prior to the other data traffic;
- means for transmitting the backhaul data traffic from each central control node to the at least one remote subscriber node over a wireless backhaul channel during the one or more time slots; and
- means for transmitting the backhaul data traffic from the at least one remote subscriber node to the wide area network.

* * * * *

UNITED STATES PATENT AND TRADEMARK OFFICE
CERTIFICATE OF CORRECTION

PATENT NO. : 6,687,503 B1
DATED : February 3, 2004
INVENTOR(S) : John David Porter et al.

It is certified that error appears in the above-identified patent and that said Letters Patent is hereby corrected as shown below:

<u>Column 7,</u>
Line 54, "networks." should read -- network --.
Line 66, "within" should read -- outside of --.

Signed and Sealed this

Fourth Day of May, 2004

JON W. DUDAS
*Acting Director of the United States Patent and Trademark Office*